(12) United States Patent
Mukherjee et al.

(10) Patent No.: US 10,599,577 B2
(45) Date of Patent: Mar. 24, 2020

(54) ADMISSION CONTROL FOR MEMORY ACCESS REQUESTS

(71) Applicant: Cavium, LLC, Santa Clara, CA (US)

(72) Inventors: Shubhendu Sekhar Mukherjee, Southborough, MA (US); Michael Bertone, Marlborough, MA (US); David Albert Carlson, Haslet, TX (US); Richard Eugene Kessler, Northborough, MA (US); Wilson Snyder, Holliston, MA (US)

(73) Assignee: Cavium, LLC, Santa Clara, CA (US)

( * ) Notice: Subject to any disclaimer, the term of this patent is extended or adjusted under 35 U.S.C. 154(b) by 820 days.

(21) Appl. No.: 15/222,184

(22) Filed: Jul. 28, 2016

(65) Prior Publication Data

US 2017/0322886 A1 Nov. 9, 2017

Related U.S. Application Data

(60) Provisional application No. 62/333,476, filed on May 9, 2016.

(51) Int. Cl.
*G06F 12/00* (2006.01)
*G06F 12/0888* (2016.01)
*G06F 12/0811* (2016.01)
*G06F 12/084* (2016.01)

(52) U.S. Cl.
CPC ........ *G06F 12/0888* (2013.01); *G06F 12/084* (2013.01); *G06F 12/0811* (2013.01); *G06F 2212/1024* (2013.01)

(58) Field of Classification Search
None
See application file for complete search history.

(56) References Cited

U.S. PATENT DOCUMENTS

| | | | |
|---|---|---|---|
| 5,721,864 A | 2/1998 | Chiarot et al. |
| 7,627,742 B2 | 12/2009 | Bose et al. |
| 8,443,151 B2 | 5/2013 | Tang et al. |
| 8,856,452 B2 | 10/2014 | Sun et al. |
| 2009/0199190 A1 | 8/2009 | Chen et al. |
| 2014/0108740 A1 | 4/2014 | Rafacz et al. |

*Primary Examiner* — Midys Rojas
(74) *Attorney, Agent, or Firm* — Young Basile Hanlon & MacFarlane, P.C.

(57) ABSTRACT

Managing memory access requests for a plurality of processor cores includes: storing admission control information for determining whether or not to admit a predetermined type of memory access request into a shared resource that is shared among the processor cores and includes one or more cache levels of a hierarchical cache system and at least one memory controller for accessing a main memory; determining whether or not a memory access request of the predetermined type made on behalf of a first processor core should be admitted into the shared resource based at least in part on the stored admission control information; and updating the admission control information based on a latency of a response to a particular memory access request admitted into the shared resource, where the updating depends on whether the response originated from a particular cache level included in the shared resource or from the main memory.

24 Claims, 2 Drawing Sheets

ADMISSION CONTROL FOR MEMORY ACCESS REQUESTS

CROSS-REFERENCE TO RELATED APPLICATIONS

This application claims the benefit of U.S. Provisional Application No. 62/333,476, filed May 9, 2016, the content of which is incorporated herein by reference.

BACKGROUND

This description relates to admission control for memory access requests.

Modern processors support 'speculative' memory access requests. For example, a speculative memory access request may include prefetch requests that are sent to preload an instruction cache or data cache based on a predicted access pattern. Prefetch requests can include a 'software prefetch' where an explicit prefetch instruction inserted into a processor's pipeline includes a particular address to be prefetched, or a 'hardware prefetch' performed by hardware within the processor without an explicit prefetch instruction being inserted into its pipeline. Speculative memory access requests may also include load or store instructions issued within a pipeline to earlier than the pipeline would have normally issued the instruction without speculation, to improve performance. For example, branch prediction can be used to speculatively issue a load or store instruction before a branch condition of a branch instruction has been determined. However, these speculative memory access requests may not be correct. For example, a speculative load instruction could be unused, or even terminated before it has completed, if the pipeline is flushed after a misprediction. Prefetch requests may bring data/instructions into a data/instruction cache without that data/instruction being immediately used, making a particular prefetch request useless. Some processors may be configured to perform prefetch throttling, where congestion and prefetch accuracy are taken into account as feedback for throttling a source of prefetch requests. However, some techniques for measuring congestion may have certain limitations or may even exacerbate the congestion, as described in more detail below.

SUMMARY

In one aspect, in general, a method for managing memory access requests for a plurality of processor cores includes: storing admission control information for determining whether or not to admit a predetermined type of memory access request into a shared resource that is shared among the processor cores and includes one or more cache levels of a hierarchical cache system and at least one memory controller for accessing a main memory; determining whether or not a memory access request of the predetermined type made on behalf of a first processor core should be admitted into the shared resource based at least in part on the stored admission control information; and updating the admission control information based on a latency of a response to a particular memory access request admitted into the shared resource, where the updating depends on whether the response originated from a particular cache level included in the shared resource or from the main memory.

In another aspect, in general, a processor includes: a plurality of processor cores; a shared resource that is shared among the processor cores and includes one or more cache levels of a hierarchical cache system and at least one memory controller for accessing a main memory; and a memory access request manager configured to manage memory access requests for one or more of the processor cores. The managing includes: storing admission control information for determining whether or not to admit a predetermined type of memory access request into the shared resource; determining whether or not a memory access request of the predetermined type made on behalf of a first processor core should be admitted into the shared resource based at least in part on the stored admission control information; and updating the admission control information based on a latency of a response to a particular memory access request admitted into the shared resource, where the updating depends on whether the response originated from a particular cache level included in the shared resource or from the main memory.

Aspects can include one or more of the following features.

The updating includes: comparing the latency of the response to the particular memory access request to a first threshold if the response originated from the particular cache level, and comparing the latency of the response to the particular memory access request to a second threshold if the response originated from the main memory, where the second threshold is larger than the first threshold.

The admission control information includes a quantitative measure that changes in different directions depending on whether a latency of a response to a memory access request is larger or smaller than at least one of the first or second thresholds.

The quantitative measure includes a range of values over which changes in the same direction accumulate over multiple successive updates.

The quantitative measure includes at least one value for which the quantitative measure remains the same over multiple successive updates.

The quantitative measure comprises a state of a saturating counter.

The admission control information includes: a first quantitative measure that changes based on a result of comparing a latency of a response to a memory access request to the first threshold, and a second quantitative measure that changes based on a result of comparing a latency of a response to a memory access request to the second threshold.

The first quantitative measure comprises a state of a first saturating counter, and the second quantitative measure comprises a state of a second saturating counter.

The shared resource further includes an interconnection network among multiple of the processor cores.

The latency of the response to the particular memory access request is measured based on a number of cycles that occur between the particular memory access request being made on behalf of the first processor core and the response to the particular memory access request being received at the first processor core.

The latency of the response to the particular memory access request is measured based on a number of cycles that occur between the particular memory access request being made on behalf of a second processor core and the response to the particular memory access request being received at the second processor core.

The predetermined type of memory access request comprises a speculative memory access request.

Aspects can have one or more of the following advantages.

In a multi-core processor, certain techniques for measuring congestion, such as counting a number of outstanding transactions, have certain limitations or may even exacerbate the congestion. For example, measuring a queuing state within a particular core may not provide enough information about the degree of congestion to indicate whether additional speculative memory access requests should be made. Measuring counts of outstanding transactions outside of the cores, such as at various points within an interconnection network, or other portions of an 'uncore' shared by the cores, may provide more information, but may also require additional communication between the cores and the uncore, which may add to the congestion. Alternatively, instead of such measures of congestion, a memory request latency can be measured, which provides a direct indication of whether or not additional speculative memory access requests should be made, without significantly exacerbating congestion.

Using this latency information for admission control can facilitate balancing of single core vs. multi-core performance. Multiple cores typically need to contend for a shared resource such as the interconnection network that connects those cores to each other and/or to multiple levels of caches and main memory controller. This shared resource comprising the entire substrate of interconnection network, caches, and main memory controller will be referred to herein as the 'uncore'. However, other types of shared resources can also be managed using the techniques described herein. While the uncore can sustain full peak bandwidth of several cores, uncores often do not have enough peak bandwidth to satisfy the bandwidth demand of all cores in the multi-core system. A single core may make bandwidth demands from the uncore in two forms. First, a core issues non-speculative memory access requests to the uncore. For example, a non-speculative load request to the last-level cache may be sent to acquire a cache block. Non-speculative requests must be sent to the uncore, if deemed necessary, but typically cannot be canceled. Second, a core issues speculative memory access requests to the uncore. The bandwidth demands made by a single core in a multi-core situation may hurt the overall performance of the multicore. Latency-based admission control for slowing, or completely stopping, speculative memory access requests, such as prefetches, has the potential to improve overall performance of the multi-core system.

Other features and advantages of the invention will become apparent from the following description, and from the claims.

DESCRIPTION

Figure 1:
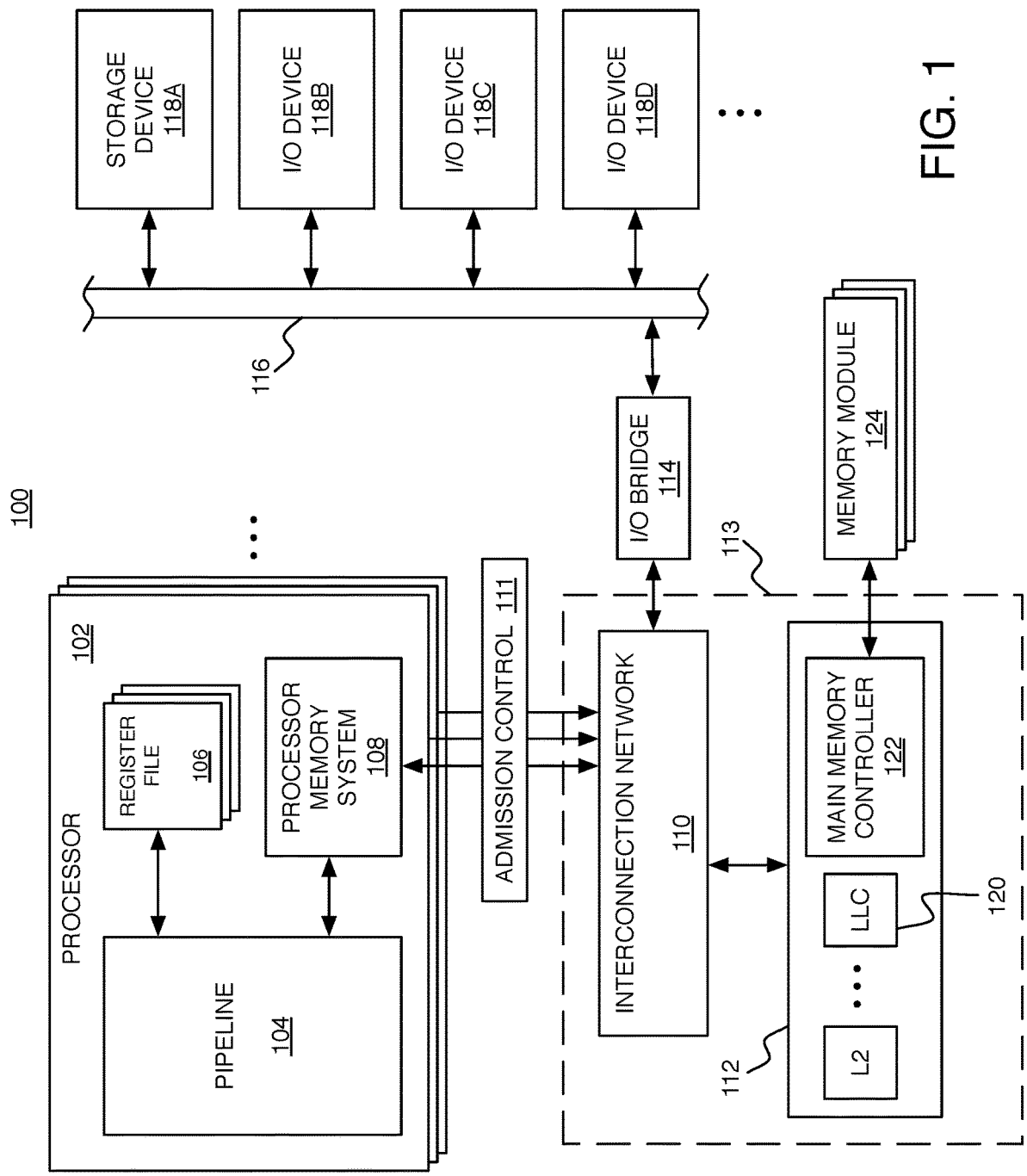
FIG. 1 is a schematic diagram of a computing system.

FIG. 1 shows an example of a computing system 100 in which the admission control techniques can be used. The system 100 includes processor cores 102 of a multi-core architecture, where each processor core 102 (or each "core") comprises an individual central processing unit (CPU) with associated circuitry. In this example, each processor core 102 includes a pipeline 104, one or more register files 106, and a processor memory system 108. Each processor core 102 is connected to an interconnection network 110 (e.g., bus, cross-bar switch, mesh network, etc.) through admission control circuitry 111. The admission control circuitry 111 determines whether or not certain memory access requests (e.g., speculative memory access requests) should be made or canceled based on the latest admission control information, as described in more detail below. In this example, each processor core 102 is configured to have its own admission control manager to make independent admission control decisions based on its own admission control information, but in other examples, the processor cores could share admission control information and/or decisions. The interconnection network 110 enables communication with an external memory system 112 and an input/output (I/O) bridge 114. The interconnection network 110 and the external memory system 112 together are referred to herein as the uncore 113. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 112 together form a hierarchical cache system including at least a first level (L1) cache within the processor memory system 108, and any number of higher level (L2, L3, . . . ) caches within the external memory system 112. The highest level cache within the external memory system 112 (which may be the L2 cache if there are only two levels in the hierarchy) is the LLC 120 (labeled herein as 'Ln'), which is accessed just before main memory (labeled herein as 'M'). Of course, this is only an example. The exact division between which level caches are within the processor memory system 108 and which are in the external memory system 112 can be different in other examples. For example, the L1 cache and the L2 cache could both be internal to the processor core 102, and the L3 (and higher) caches could be external to the processor core 102. Each processor core 102 could have its own internal L1 cache, and the processor cores could share an L2 cache. For the purposes of some of the examples described herein, the system 100 will be assumed to have an L1 cache within each processor core 102 and the L2 cache and higher levels within the external memory system 112. The external memory system 112 also includes a main memory controller 122, which is connected to any number of memory modules 124 serving as main memory (e.g., Dynamic Random Access Memory modules). In a particular cache level of the hierarchy, each cache entry includes space for storing the data words of a particular memory block along with bits for determining whether a particular word from a memory block is found in that cache level (i.e., a 'hit') or not found in that cache level (i.e., a 'miss'). After a miss in one level, the cache system attempts to retrieve the memory block from a higher level cache, or from the main memory M (in the case of a miss in the LLC).

The admission control manager (ACM) for a particular processor core is configured to measure the latency of memory access requests in units of cycles of a clock signal used by that processor core. The clock signal may be derived from a clock circuit (not shown) shared by the processor cores, for example, in some cases with other circuitry such as a frequency divider and/or delay circuitry being used to provide the actual clock signal. The ACM can be configured to measure the latency of every memory access request (speculative and non-speculative), or a sampled subset of fewer than all memory access requests. As the higher level caches increase in size, the latency generally also increases. Typical sizes for a two level hierarchical cache system may be, for example: a 32 KB L1 cache, a 1 MB L2 cache, and one or more 2 GB DRAM main memory modules. The latency of requests that hit in the L1 cache may be a few cycles, the latency of requests that hit in the L2 cache may be a few tens of cycles, and the latency of requests that must go to the main memory may be over a hundred cycles.

The ACM measures the latency of a memory access request by counting cycles between the memory access request being initiated (e.g., by a load or store instruction being issued within the pipeline 104) and a response to the memory access request being received at the processor core 102 being managed by that ACM. If the memory access request corresponds to a load instruction, then the response is the data value being requested and the latency measures the number of cycles between issuance of the load instruction and reception of the returned value. If the memory access request corresponds to a store instruction, then the response is an acknowledgement that the date value has been stored and the latency measures the number of cycles between issuance of the store instruction and reception of the acknowledgment. This measured latency is denoted as Latency[Li], where Li is L2, L3, . . . Ln (assuming only the L1 cache is included within the processor core 102), depending on which cache level in the uncore 113 was hit, or is denoted as Latency[M] if all cache levels have missed.

The uncore 113 is also configured to provide information to the admission control circuitry 111, without substantially impacting the traffic that is already consuming bandwidth between the processor cores and the uncore 113. In particular, the responses to memory access requests that are already being sent are augmented with a 'hit identifier' to indicate the specific cache level (L2 to Ln) that was hit or to indicate the main memory (M) if no cache level was hit. In systems in which there is only a single cache level in the uncore 113 as the LLC (e.g., L2=Ln), the hit identifier may be in the form of a Boolean variable coded as a single bit ('1' indicating an LLC hit, and '0' indicating an LLC miss where the request was satisfied by the main memory M). Otherwise, the hit identifier would be encoded by more than a single bit.

The ACM updates admission control information based on the measured latencies for different responses. By taking into account the hit identifier within the responses, the updating of the admission control information for any particular memory access request and corresponding response depends on whether the response originated from a particular cache level or from the main memory. This fine-grained updating of the admission control information enables responsiveness to congestion at various portions of the uncore 113. For example, in some implementations, the latency is compared to a different threshold depending on where the hit identifier indicates the response originated from. Storage within the admission control circuitry 111 stores programmable latency thresholds, denoted as LatencyThreshold[Li] where Li is L2, L3, . . . Ln, or M. The value of each threshold can be tuned to an appropriate value to detect congestion associated with different cache levels. For example, if the average latency in the L2 cache is 15 cycles, then LatencyThreshold[L2] may be set to 25 cycles; if the average latency in the L3 cache is 40 cycles, then LatencyThreshold[L2] may be set to 60 cycles; and if the average latency for memory access requests that reach the main memory is 170 cycles, then the LatencyThreshold[M] may be set to 250 cycles. The thresholds may even change during operation based on various factors.

The result of comparing a measured latency to a corresponding threshold is then used to update an accumulated latency history. The accumulated latency history can be tracked using any quantitative measure that changes in different directions depending on whether a latency is larger or smaller than the corresponding threshold. One example of such a quantitative measure is a saturating counter, which increments up or down (by integers) until it reaches a maximum value, or a minimum value, respectively. For example, if the latency of a response at cache level i is less than LatencyThreshold[Li], the saturating counter is decremented. If the latency of a response at cache level i is greater than LatencyThreshold[Li], the saturating counter is incremented. In the unsaturated state (between the maximum and minimum values) the counter changes its value to reflect any changes in the latency. If the latency for a cache level, or the main memory, is consistently lower (or higher) than the corresponding threshold then the counter will count down (or up) to accumulate that change over successive updates. In the saturated state (at the maximum or minimum value) the counter will remain at the same value for any updates that continue to reflect the same state of latency being higher or lower than the corresponding threshold. Other types of quantitative measures with similar properties could also be used. In some implementations, in addition to augmenting the response with the hit identifier, the response can also be augmented with information indicating how many cycles it took to generate a miss at intermediate cache levels before there was a hit. Such information can also be accumulated and compared to corresponding thresholds for updating additional counters providing even more admission control information.

The ACM can be configured to use a single counter for all threshold comparisons for different hit identifiers, or a different respective counter for each threshold comparison for different hit identifiers. In some implementations, there is a single saturating counter that ranges from −N to N−1. The saturation value N can be as high as a hardware counter can count based on the number of bits stored in the counter, or the saturation level N can be selected (e.g., by limiting the counter bits used) to ensure a lower recovery time from a fully saturated state to the midpoint of the counter. Different values of the counter can be mapped to different admission control decisions. For example, when this counter is zero or negative, the ACM can allow the processor core it is managing to continue issuing speculative memory access requests for admission into the uncore 113. When the counter is positive, the ACM can be configured to either slow down speculative memory access requests (either on an absolute basis or a relative basis compared to number of non-speculative memory access requests), or to completely prevent any speculative memory access requests at all (either by preventing the processor core from issuing them or by preventing any issued requests from entering the uncore 113).

In some implementations, there is a separate saturating counter for each cache level L2 through Ln (the LLC), and one for the main memory M (i.e., one for each hit identifier). The counters are updated in the same way as described above, but separately for each hit identifier. The ACM can then be configured to use a combination of states of the different counters to make admission control decisions. For example, in a simple example in which there one counter for is a single L2 cache as the LLC (Counter[L2]), and another counter for the main memory M (Counter[M]), the states can be combined as follows for admitting, slowing, or stopping speculative memory access requests:

Admit: Counter[L2]≤0 and Counter[M]≤0
Slow: (Counter[L2]≤0 and Counter[M]>0) or (Counter[L2]>0 and Counter[M]≤0)
Stop: Counter[L2]>0 AND Counter[M]>0

Other examples could have various modifications. For example, the value at which a counter changes state could be closer or further from one of the saturation values; or the state of the counters could be represented with finer granularity than a binary state; or the counters could be combined using different logic; or there could be multiple counters, but fewer than one for each cache level and one for the main memory.

Figure 2:
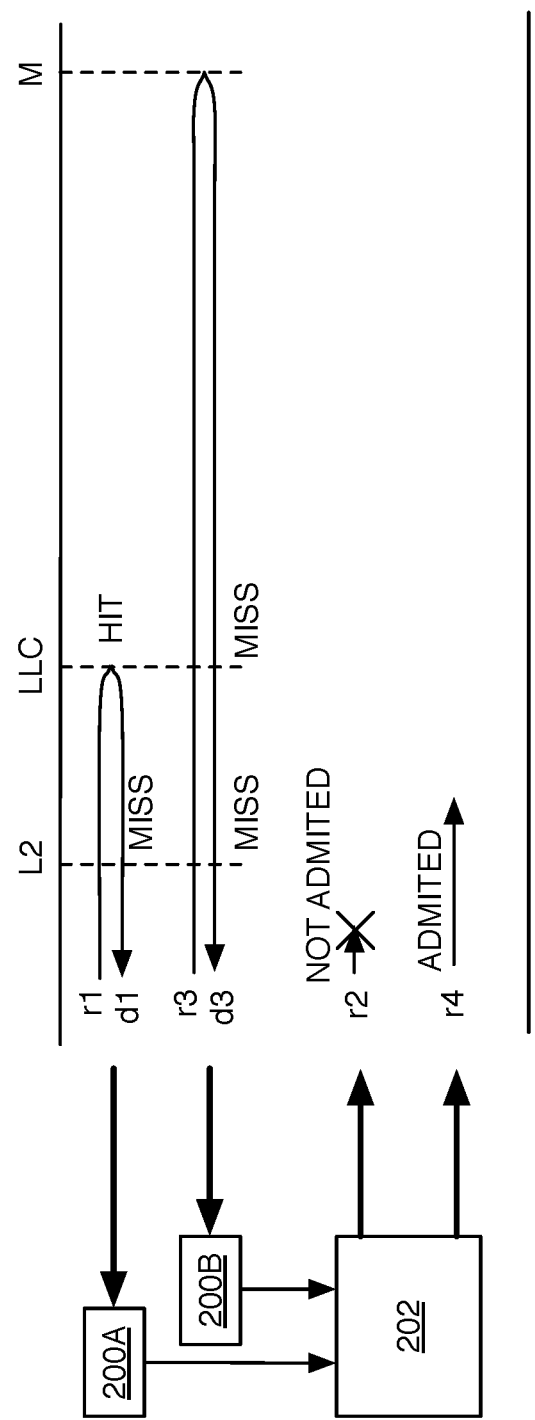
FIG. 2 is a schematic diagram illustrating the updating and use of admission control information.

FIG. 2 illustrates the updating and use of admission control information based on measured latency of memory access requests. In this example, each speculative memory access request is either admitted or not admitted base on combined admission control information 202 that is a function of a quantitative measure 200A associated with the LLC and a quantitative measure 200B associated with the main memory M (and a quantitative measure associated with the L2 cache, not shown). Non-speculative memory access requests are always admitted. Both types of memory access requests are potentially used to update the admission control information 202 (if admitted). A memory access request r1 is admitted into the uncore 113, and misses the L2 cache but hits the LLC. A measured latency delay d1 is used to update a quantitative measure 200A associated with the LLC. A speculative memory access request r2 is not admitted into the uncore 113 base on combined admission control information 202. A memory access request r3 is admitted into the uncore 113, and misses the L2 cache and the LLC, so must be serviced by the main memory M. A measured latency delay d3 is used to update the quantitative measure 200B. A speculative memory access request r4 is admitted into the uncore 113 based on a change in the combined admission control information 202 caused by the latest update from r3.

Other embodiments may fall within the scope of the following claims, which do not necessarily include all of the features or advantages of the embodiments described above.

What is claimed is:

1. A method for managing memory access requests for a plurality of processor cores, the method comprising:
   storing admission control information for determining whether or not to admit a predetermined type of memory access request into a shared resource that is shared among the processor cores and includes one or more cache levels of a hierarchical cache system and at least one memory controller for accessing a main memory;
   determining whether or not a memory access request of the predetermined type made on behalf of a first processor core should be admitted into the shared resource based at least in part on the stored admission control information; and
   updating the admission control information based on a latency of a response to a particular memory access request admitted into the shared resource, where the updating depends on whether the response originated from a particular cache level included in the shared resource or from the main memory.

2. The method of claim 1, wherein the updating includes: comparing a latency of a first response to a first particular memory access request to a first threshold where the first response originated from the particular cache level, and comparing a latency of a second response to a second particular memory access request to a second threshold where the second response originated from the main memory, where the second threshold is larger than the first threshold.

3. The method of claim 2, wherein the admission control information includes a quantitative measure that changes in different directions depending on whether a latency of a response to a memory access request is larger or smaller than at least one of the first or second thresholds.

4. The method of claim 3, wherein the quantitative measure includes a range of values over which changes in the same direction accumulate over multiple successive updates.

5. The method of claim 4, wherein the quantitative measure includes at least one value for which the quantitative measure remains the same over multiple successive updates.

6. The method of claim 3, wherein the quantitative measure comprises a state of a saturating counter that increments up or down until a maximum value or minimum value is reached.

7. The method of claim 2, wherein the admission control information includes: a first quantitative measure that changes based on a result of comparing a latency of a response to a memory access request to the first threshold, and a second quantitative measure that changes based on a result of comparing a latency of a response to a memory access request to the second threshold.

8. The method of claim 7, wherein the first quantitative measure comprises a state of a first saturating counter, and the second quantitative measure comprises a state of a second saturating counter.

9. The method of claim 1, wherein the shared resource further includes an interconnection network among multiple of the processor cores.

10. The method of claim 9, wherein the latency of the response to the particular memory access request is measured based on a number of cycles that occur between the particular memory access request being made on behalf of the first processor core and the response to the particular memory access request being received at the first processor core.

11. The method of claim 9, wherein the latency of the response to the particular memory access request is measured based on a number of cycles that occur between the particular memory access request being made on behalf of a second processor core and the response to the particular memory access request being received at the second processor core.

12. The method of claim 1, wherein the predetermined type of memory access request comprises a speculative memory access request.

13. A processor comprising:
   a plurality of processor cores;
   a shared resource that is shared among the processor cores and includes one or more cache levels of a hierarchical cache system and at least one memory controller for accessing a main memory; and
   a memory access request manager configured to manage memory access requests for one or more of the processor cores, the managing including:
      storing admission control information for determining whether or not to admit a predetermined type of memory access request into the shared resource;
      determining whether or not a memory access request of the predetermined type made on behalf of a first processor core should be admitted into the shared resource based at least in part on the stored admission control information; and updating the admission control information based on a latency of a response to a particular memory access request admitted into the shared resource, where the updating depends on whether the response originated from a particular cache level included in the shared resource or from the main memory.

14. The processor of claim 13, wherein the updating includes: comparing a latency of a first response to a first particular memory access request to a first threshold where the first response originated from the particular cache level, and comparing a latency of a second response to a second particular memory access request to a second threshold where the second response originated from the main memory, where the second threshold is larger than the first threshold.

15. The method of claim 14, wherein the admission control information includes a quantitative measure that changes in different directions depending on whether a latency of a response to a memory access request is larger or smaller than at least one of the first or second thresholds.

16. The method of claim 15, wherein the quantitative measure includes a range of values over which changes in the same direction accumulate over multiple successive updates.

17. The method of claim 16, wherein the quantitative measure includes at least one value for which the quantitative measure remains the same over multiple successive updates.

18. The method of claim 15, wherein the quantitative measure comprises a state of a saturating counter that increments up or down until a maximum value or minimum value is reached.

19. The method of claim 14, wherein the admission control information includes: a first quantitative measure that changes based on a result of comparing a latency of a response to a memory access request to the first threshold, and a second quantitative measure that changes based on a result of comparing a latency of a response to a memory access request to the second threshold.

20. The method of claim 19, wherein the first quantitative measure comprises a state of a first saturating counter, and the second quantitative measure comprises a state of a second saturating counter.

21. The method of claim 13, wherein the shared resource further includes an interconnection network among multiple of the processor cores.

22. The method of claim 21, wherein the latency of the response to the particular memory access request is measured based on a number of cycles that occur between the particular memory access request being made on behalf of the first processor core and the response to the particular memory access request being received at the first processor core.

23. The method of claim 21, wherein the latency of the response to the particular memory access request is measured based on a number of cycles that occur between the particular memory access request being made on behalf of a second processor core and the response to the particular memory access request being received at the second processor core.

24. The method of claim 13, wherein the predetermined type of memory access request comprises a speculative memory access request.

* * * * *